Patented Mar. 18, 1952

2,589,226

UNITED STATES PATENT OFFICE 2,589,226

ACYLATION OF POLYSACCHARIDES IN FORMAMIDE

John F. Carson, Berkeley, Calif., assignor to the United States of America as represented by the Secretary of Agriculture No Drawing. Application November 22, 1946, Serial No. 711,762

13 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the acylation of polysaccharides particularly those having a molecular weight above about 5,000 but which are soluble in dilute aqueous alkali, i. e., those which are non-cellulosic.

Polysaccharides of the afore-mentioned type have been acylated prior to this invention but many difficulties have been encountered. Thus Schneider et al. [Berichte der Deutschen Chemischen Gesellschaft, vol. 69, pp. 309 and 2530, 1936] swelled pectin with acetic acid and then acylated at 20–40° with acetic anhydride in the presence of various catalysts such as sulphuric acid, perchloric acid, zinc chloride, and pyridine in 1% concentration. The products were defined by them as being poorly soluble and degraded. Carson et al. (Jour. Am. Chem. Soc., vol. 67, pp. 687–689 (1945) have described a process for the acylation of pectin wherein the pectin is initially swelled in water and then the water gradually replaced by pyridine. This procedure was found to be unsatisfactory when applied to pectic or alginic acids.

It has now been found that polysaccharides can be readily acylated by first dispersing them in formamide to yield a viscous solution or paste in which form they can be readily acylated with the acid anhydride in the presence of pyridine.

An object of this invention is to provide methods for acylating polysaccharides having a molecular weight over 5,000 but which are soluble in dilute alkali.

A further object of this invention is to provide a method of acylating the aforesaid type of polysaccharides wherein the polysaccharide, dispersed in formamide, is subjected to the action of an organic acylating agent.

The procedure described is of general application for the acylation of polysaccharides which can be dissolved or gelatinized in formamide. The method possesses certain advantages over previously described techniques, in that no extensive pre-treatment is required such as precipitation from aqueous solutions or pastes into alcohol or pyridine and either an oven-dry or an air-dry sample may be esterified directly. A low temperature of esterification may be used which should minimize degradation. Esterification adjuvants such as sulphuric acid, perchloric acid, zinc chloride, etc. are rendered unnecessary. The process is simple and produces high grade esters in which the available hydroxy groups are all substantially completely esterified. The esters are slightly colored but this color can be readily removed by washing with water or alcohol.

Further objects and advantages of the invention will be evident from the disclosure herein.

In order to illustrate my novel process the following examples are submitted. It is understood, however, that these examples are offered by way of illustration and not restriction.

Example 1.—Pectic acid di-propionate

Pectic acid was prepared from fresh lemon peel by the procedure of Baier et al. [Ind. & Eng. Chem., vol. 33, p. 287, 1941]. Thirty-five grams of this pectic acid was dried in vacuo at 60° C. for 18 hours and then added in small quantities to 400 grams of formamide at 50° C. in a 2-liter, 3-neck flask equipped with a thermometer, separatory funnel, and a stainless steel stirrer. The suspension was stirred for 1 hour at 45–50° C., during which time the pectic acid became completely dispersed to a stiff paste. Pyridine (300 grams) was added in small portions over a period of 30 minutes with vigorous stirring at 45 to 50° C. and the mixture cooled to 33° C. Two hundred grams of propionic anhydride was added in portions of 50 grams each hour and the reaction mixture was stirred for 5 hours at 30° C. and allowed to stand overnight at room temperature. The thick viscous solution was poured into 5 liters of cold 2% hydrochloric acid containing 500 g. of chopped ice, the ester precipitating as a cream-colored flocculent material. The precipitated ester was stirred for an hour, isolated by filtration, washed first with cold 0.5% hydrochloric acid, then 4 times with 250 milliliter portions of distilled water, resuspended in 3 liters of distilled water, allowed to stand overnight and filtered. Pectic acid di-propionate obtained as a wet pasty material was dried for 48 hours in vacuo at 35° C. over solid sodium hydroxide, ground in a Wiley mill to 40 mesh, and redried for analysis 48 hours in vacuo at 50° C. over phosphorus pentoxide. Yield of pectic acid di-propionate, 52 grams, i. e., 91% of the theoretical. The ester has a propionyl content of 40.2% (calculated for a polygalacturonide dipropionate, 39.6%).

Example 2.—Alginic acid dibutyrate

Twenty grams of alginic acid (dried in vacuo 18 hours at 60° C. over phosphorus pentoxide) was stirred in a 2-liter flask (as described in Example 1) with 300 grams of formamide for 30 minutes at 45° C. to yield a smooth paste and 200 grams of pyridine was then added slowly with vigorous stirring over a 30-minute period. To the reaction mixture cooled to 30° C. there was added 200 g. of n-butyric anhydride in quantities of 50 grams each hour and the mixture was stirred for 6 hours at 30° C. and allowed to stand overnight. The ester was isolated by pouring the reaction solution in a fine stream into 5 liters of cold 2% hydrochloric acid containing chopped ice. The precipitated ester was filtered, washed with a liter of 0.5% hydrochloric acid, and soaked overnight in a liter of 0.5% hydrochloric acid at 0° C. The alginic acid dibutyrate was filtered, washed with distilled water until free from chloride ions and butyric acid, and dried first for 48 hours in vacuo over sodium hydroxide at room temperature followed by 36 hours in vacuo at 40° C. The ester was ground to 40 mesh and redried in vacuo at 50° C. for analysis. Yield of alginic acid dibutyrate, 35.0 grams, i. e., 97% of the theoretical. Percent butyryl 44.2%, calculated for a polymannuronide dibutyrate, 44.95%.

The alginic acid used in the above example was a commercial sample extracted from *Macrocystis pyrifera*. It was de-ashed by washing with acidified 35% ethanol and hardened with 95% ethanol.

Example 3.—Starch triacetate

Commercial raw white potato starch was extracted several times in a Büchner funnel with boiling methanol. The so-purified starch was dried 20 hours in vacuo at 60° C. over phosphorus pentoxide. Twenty-five grams of the dried starch was stirred with 250 grams of formamide at 60–65° C. until the starch became dispersed to a stiff paste. Four-hundred grams of pyridine was added in small quantities over a 20-minute period with vigorous stirring at 60° C. to yield a smooth dispersion. The mixture was cooled to 35° C. and acetic anhydride was added in 25-gram portions every half-hour until 150 grams had been added. The reaction was continued with vigorous stirring for a total of 5 hours at 40° C. and the clear amber-colored gelatinous solution was poured into 4 liters of ice water. The ester, which precipitated as a pale green fibrous material, was stirred for an hour, filtered on cloth and steeped for an hour in 2 liters of distilled water. After filtration it was steeped overnight in 1500 milliliters of 95% ethanol, which removed most of the color, then washed successively with 0.1% hydrochloric acid, distilled water and 95% ethanol. The ester was air-dried for several days to a white fluffy mass, ground to 40 mesh and dried in vacuo at 50° C. over phosphorus pentoxide. Yield of starch triacetate, 41 grams, i. e., 95% of the theoretical. Proportion of acetyl, 41.9%; calculated for starch triacetate, 44.8%. The ester had a nitrogen content of 0.02%.

Example 4.—Xylan dipropionate

Xylan, prepared by extracting delignified corn cob with 5% potassium hydroxide solution, was dried in vacuo. Twelve grams of the xylan was dispersed in 250 grams of formamide by stirring for 45 minutes at 65° C. Two hundred and fifty grams of pyridine were added, with stirring and the mixture cooled to 27° C. While stirring the mixture a total of 125 grams of propionic anhydride was added in 25-gram portions every hour. The mixture was stirred for a total of five hours and the ester recovered by precipitation from ice water. A yield of 21 grams of xylan dipropionate was obtained. Proportion of propionyl 43.7%.

Example 5.—Xylan diacetate

Twenty grams of xylan, prepared by extracting de-lignified lima bean pods with 5% potassium hydroxide solution, was dispersed in 400 grams of formamide by stirring for about 45 minutes at about 65° C. Four-hundred grams of pyridine were added while stirring. Acetic anhydride was added at the rate of 50 grams per hour until 150 grams had been added. The esterification was carried out at 24–25° C. while stirring over a period of 4 hours. A yield of 33 grams of xylan diacetate was obtained. The product had an acetyl content of 37.8%.

Example 6.—Pectin di-acetate

Sixteen grams of pectin were added to 250 grams of formamide with vigorous stirring for one hour at 20–25° C. Two hundred grams of pyridine were added while stirring. The mixture was then cooled to 15° C. and acetic anhydride added as follows: 25 grams at first and an additional 25-gram portion each ½ hour until a total of 100 grams had been added. The reaction mixture was maintained at about 22° C. with constant stirring over a period of 4 hours. The mixture was allowed to stand overnight and then poured into 3 liters of cold 2% hydrochloric acid containing 1000 grams of chopped ice. The mixture was stirred for 2 hours and the product filtered off. The product was washed with distilled water, ethanol and again with distilled water and dried. Nineteen grams of pectin diacetate were obtained, i. e., 90% yield. This product had an acetyl content of 29.8%.

Example 7.—Pectin di-propionate

Thirty-five grams of citrus pectin was dispersed in 550 grams of formamide at 25° C. by stirring for one hour. Four hundred grams of pyridine was added rapidly with stirring. The mixture was cooled to 25° C. and, while stirring, propionic anhydride added as follows:

|  | Grams |
|---|---|
| Beginning | 50 |
| End of first hour | 50 |
| End of third hour | 50 |
| End of fourth hour | 50 |

The reaction mixture was stirred over a period of 5 hours at 25–27° C. and allowed to stand overnight. The solution was then precipitated by pouring into 4 liters of cold 1% hydrochloric acid containing 1000 grams of chopped ice. The precipitated product was filtered several times with distilled water and alcohol and dried. Fifty-two grams of pectin dipropionate were obtained, i. e., 93% of the theoretical. The product contained 37.3% propionyl (calculated 38.1% propionyl).

Example 8.—Pectin di-butyrate

Sixteen grams of citrus pectin was dispersed in 175 grams of formamide. Two-hundred milliliters of pyridine were added. Butyric anhydride (150 grams) was added from a separatory funnel at the rate of 75 grams per hour while stirring the mixture. The reaction mixture was maintained at 20–25° C. and stirred for 6 hours. The product was precipitated by pouring the reaction mixture into dilute hydrochloric acid and chopped ice, and then washed and dried. A yield of 26 grams of pectin di-butyrate was obtained.

The product had a butyryl content of 42.8% whereas the theoretical content is 43.6%.

*Example 9.—Pectic acid di-butyrate*

Pectic acid was acylated in the same manner as set forth in the foregoing examples, employing 24 grams of pectic acid, 350 grams of formamide, 300 grams of pyridine, and 200 grams of butyric anhydride. The esterification was carried out at 35° C. for 6 hours and pectic acid di-butyrate was obtained in 96% yield and had a butyryl content of 40.7% (calculated 45.0%).

*Example 10.—Alginic acid di-propionate*

Alginic acid was acylated in the same manner as set forth in the foregoing examples, employing 30 grams of alginic acid, 350 grams of formamide, 200 grams of pyridine, 200 grams of propionic anhydride. The esterification was carried out at 30° C. over a period of 6 hours. Alginic acid di-propionate was obtained in 92% yield and had a propionyl content of 35.3% (calculated 39.6%).

*Example 11.—Gum tragacanth propionate*

Gum tragacanth was acylated in the same manner as set forth in the foregoing examples, employing 18 grams of tragacanth, 350 grams of formamide, 250 grams of pyridine, 200 grams of acetic anhydride. The esterification was carried out over a period of 20 hours at 22° C. Tragacanth propionate was obtained in 92% yield and had a propionyl content of 44.6%.

*Example 12.—Gum arabic acetate*

Gum arabic was acylated in the same manner as set forth in the foregoing examples using 25 grams of gum arabic, 170 grams of formamide, 300 grams of pyridine, 150 grams of acetic anhydride. The esterification was carried out over a period of 20 hours at 23° C. A yield of 91% of gum arabic acetate was obtained which had an acetyl content of 41.3%.

*Example 13.—Gum arabic propionate*

The above procedure was applied to gum arabic using propionic anhydride as the acylating agent. The product gum arabic propionate had a propionyl content of 46.9%.

The described process can be utilized for the acylation of all polysaccharides which are soluble in dilute alkali. Polysaccharides of low molecular weight, such as sucrose, are operative in the process. However, there is no particular advantage in the instant process over the known methods of acylation when applied to these lower molecular weight polysaccharides. The process described is particularly applicable to polysaccharides which have a molecular weight above 5000 and which are soluble in dilute alkali, that is, pectin, pectic acid, pectinic acids, gum arabic, gum tragacanth, alginic acid, starch, and hemicelluloses such as xylan, mannan, galactan, etc. Cellulose does not operate efficiently in the process and is not included within the scope of this invention. Cellulose is a polysaccharide but cannot be dissolved in dilute aqueous alkali. The compounds which may be acylated according to this invention can also be described as "non-cellulosic polysaccharides."

The process is generally useful to produce esters of the polysaccharides with an aliphatic acid. As the acylating agent use can be made of any aliphatic acyl anhydride such as acetic anhydride, the various isomeric butyric anhydrides, the isomeric valeric anhydrides, etc. If mixed esters are desired, mixtures of the anhydrides may be used or mixed anhydrides, such as acetyl propionyl anhydride, can be employed. It has been found that acyl chlorides are not satisfactory as they cause decomposition of the reactants involving formation of the poisonous gas, hydrogen cyanide.

In the instant process the polysaccharide is first dispersed in formamide to obtain a smooth paste or viscous sol. The quantity of formamide required varies with the particular polysaccharide and is governed by the viscosity of the dispersion. Enough formamide must be used to get a dispersion sufficiently liquid so that it can be agitated efficiently. It has been found that one part of gum tragacanth required about 20 parts by weight of formamide to yield a paste of satisfactory consistency. One part of pectic or alginic acids required from 10 to 15 parts by weight of formamide while in the case of gum arabic only 6 parts by weight of formamide were required per part of gum arabic. In general, about 6 to about 20 parts by weight of formamide per part of polysaccharide has been found satisfactory. However this proportion is not critical and it is only necessary to use such a proportion of formamide as is necessary to get a mixture capable of being agitated.

Swelling and gelling of the polysaccharide is accomplished by stirring the polysaccharide with the formamide until a smooth paste or viscous sol is obtained. It has been found that generally the result is obtained by stirring about 30 to 60 minutes. The temperature at which the dispersion takes place is not critical but generally a temperature somewhat above room temperature (45 to 50° C.) affords a more rapid dispersion.

The amount of acid anhydride used depends on the particular polysaccharide being reacted. In general, at least 1 mol. of anhydride per hydroxy group in the polysaccharide unit is necessary, preferably an excess of anhydride is used. Thus, in the case of pectin, and pectic acid, and alginic acid there are approximately two hydroxy groups per repeating unit hence at least 2 mols. of anhydride are employed per equivalent of such polysaccharide.

The amount of pyridine used is not critical. It is preferred to add sufficient pyridine to neutralize the acid released from the anhydride and not entering into the esterification. Thus if the compound being reacted contains one hydroxy group and acetic anhydride is used in the amount of 1 mol per mol of compound, then one mol of pyridine should preferably be present. In every case the one mol of anhydride esterifies one hydroxy group while releasing one mol of acid. The quantity of pyridine should be sufficient to neutralize this mol of free acid. The reaction can be illustrated by the equation:

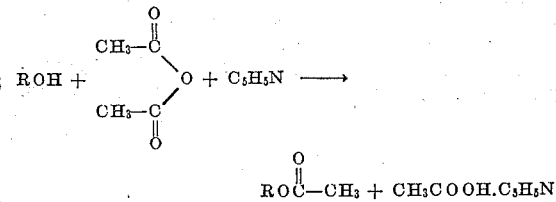

R is representing the polysaccharide nucleus.

Preferably an excess of pyridine is used and the excess operates as an additional solvent and thins the mixture making stirring easier. It has been found that other liquid tertiary amines such as quinoline and triethyl amine are suitable in place of pyridine.

The temperature of esterification is not critical. However, it has been found that temperatures above 50° C. are best avoided as decomposition begins at that point. It has been found that temperatures in the neighborhood of 20 to 40° C. give good results.

In some of the examples above the process has been applied to purified polysaccharides. This purification is not essential and the process is equally applicable to the commercial or technical grades of the polysaccharides of the aforementioned type. Likewise the products need not be subjected to the rigorous purifications described in some of the examples. Thus the esterification product precipitated with dilute acid, washed with water and then dried has been found to be sufficiently pure for technical requirements.

The esters prepared according to this invention are capable of being used to prepare films. Thus, if pectin dipropionate or dibutyrate is dissolved in a solvent such as dioxane and the solvent allowed to evaporate a transparent film is formed. Preferably a small amount (16%) of tri-orthocresyl phosphate or dibutyl phthalate should be added as a plasticizer. The resulting film is strong and flexible resembling cellophane in appearance and properties.

Having thus described my invention, I claim:

1. The process of acylating a polysaccharide, which is soluble in dilute alkali, comprising subjecting such a polysaccharide, dispersed in formamide, to reaction with an aliphatic acid anhydride in the presence of a tertiary amine at a temperature no higher than about 50° C.

2. The process of acylating a polysaccharide, which is soluble in dilute alkali, comprising subjecting such a polysaccharide, dispersed in formamide, to reaction with an aliphatic acid anhydride in the presence of pyridine at a temperature no higher than about 50° C.

3. The process of acylating a polysaccharide, which is soluble in dilute alkali, comprising subjecting such a polysaccharide, dispersed in formamide, to reaction with an aliphatic acid anhydride in the presence of pyridine, the proportion of formamide to polysaccharide being from about 6 to about 20 parts by weight of formamide for each part by weight of polysaccharide the dispersion in formamide and the reaction with the anhydride being in the substantial absence of water and at a temperature no higher than about 50° C.

4. The process of acylating a polyuronide which comprises subjecting a polyuronide, dispersed in formamide, to reaction with an aliphatic acid anhydride in the presence of pyridine.

5. The process of acylating pectin which comprises subjecting pectin, dispersed in formamide to reaction with an aliphatic acid anhydride in the presence of pyridine at a temperature no higher than about 50° C.

6. The process of acylating pectin which comprises subjecting pectin, dispersed in formamide, to reaction with an aliphatic acid anhydride in the presence of pyridine, said pectin and formamide being in the proportion of one part by weight of pectin to about 16 parts by weight of formamide the dispersion in formamide and the reaction with the anhydride being in the substantial absence of water and at a temperature no higher than about 50° C.

7. The process of propionylating pectin which comprises subjecting pectin, dispersed in formamide, to reaction with propionic anhydride in the presence of pyridine.

8. The process of acylating a hemi-cellulose which comprises subjecting a hemi-cellulose, dispersed in formamide, to reaction with an aliphatic acid anhydride in the presence of pyridine.

9. The process of acylating xylan which comprises subjecting xylan, dispersed in formamide, to reaction with an aliphatic acid anhydride in the presence of pyridine.

10. The process of acylating xylan which comprises subjecting xylan, dispersed in formamide, to reaction with an aliphatic anhydride in the presence of pyridine, the proportion of xylan to formamide being 1 part by weight of xylan to about 20 parts by weight of formamide.

11. The process of acylating a starch which comprises subjecting a starch, dispersed in formamide, to reaction with an aliphatic acid anhydride in the presence of pyridine, the reaction being in the substantial absence of water and at a temperature no higher than about 50° C.

12. The process of acylating a starch which comprises subjecting a starch, dispersed in formamide, to reaction with an aliphatic acid anhydride in the presence of pyridine, the proportion of starch to formamide being one part by weight of starch to about 10 parts by weight of formamide.

13. The process of acylating white potato starch which comprises subjecting said starch, dispersed in formamide, to reaction with an aliphatic acid anhydride in the presence of pyridine.

JOHN F. CARSON.

REFERENCES CITED

The following references are of record in the file of this patent:

UNITED STATES PATENTS

| Number | Name | Date |
|---|---|---|
| 2,211,338 | Malm et al. | Aug. 13, 1940 |
| 2,365,173 | Caesar | Dec. 19, 1944 |
| 2,372,337 | Pascu et al. | Mar. 27, 1945 |
| 2,403,707 | Cunningham et al. | July 9, 1946 |
| 2,412,213 | Groen | Dec. 10, 1946 |

OTHER REFERENCES

Staudinger et al.: Ann. der Chemie, vol. 527 (1937), pages 202-204, 3 pages.

Carson and Maclay: Journal American Chemical Society, vol. 68, June 1946, pages 1015-1017.

Pigman: "Carbohydrate Chemistry," 1948, p. 561.